United States Patent [19]

Fisher

[11] 4,359,632

[45] Nov. 16, 1982

[54] FIRING CIRCUIT FOR CARD READER DEVICE

[76] Inventor: Charles R. Fisher, 34781 Glen Dr., Eastlake, Ohio 44094

[21] Appl. No.: 188,234

[22] Filed: Sep. 17, 1980

[51] Int. Cl.³ .............................................. G06K 7/06
[52] U.S. Cl. ..................................... 235/451; 346/162
[58] Field of Search ................ 235/451, 447; 346/162; 431/132

[56] References Cited

U.S. PATENT DOCUMENTS

| | | | |
|---|---|---|---|
| 3,218,647 | 11/1965 | Fenner | 235/451 |
| 3,562,496 | 2/1971 | Fisher | 346/162 X |
| 3,781,163 | 12/1973 | Ovens | 431/132 |
| 3,835,301 | 9/1974 | Barney | 346/162 |

Primary Examiner—Donald J. Yusko

Attorney, Agent, or Firm—Watts, Hoffmann, Fisher & Heinke Co.

[57] ABSTRACT

A firing circuit for selectively energizing opposed portions of a spark gap card reader. The circuit includes a source of alternating current which is first rectified by a diode and then used to charge a storage capacitor. The capacitor is discharged through a transformer to energize the card reader with a high voltage thereby enabling the reader to sense patterns on a card in the reader. The capacitor is discharged under control of a silicon controlled rectifier whose gate input is fired by activating a switch. Each time the SCR is rendered conductive it is again deactivated, i.e. rendered nonconductive by a slightly negative back biasing to the diode used to half wave rectify the alternating current source.

4 Claims, 1 Drawing Figure

4,359,632

FIRING CIRCUIT FOR CARD READER DEVICE

BACKGROUND OF THE INVENTION

1. Field of the Invention

This invention relates to a card reader and more particularly to an improved firing circuit for electrically energizing oppositely disposed terminals of a card reader.

2. Prior Art

In U.S. Pat. No. 3,562,496 to Fisher a data sensing device utilizing an improved card reader is disclosed. The card reader is adapted to scan a card by sensing the presence of passages extending throug the card. The reader has oppositely disposed electrical terminals separated by a gap into which the card is inserted. The terminals are energized by applying a voltage across the gap so that when the terminals are aligned with the passages a spark traverse the gap. This procedure enables the card reader to sense the pattern of passageways in the card.

Energy is selectively transmitted to the terminals under the control of a silicon control rectifier (SCR) switch. The silicon controlled rectifier causes a charged capacitor to discharge through a transformer and generate a rather large voltage to be applied to the terminals. If electrical energy is transmitted through the passages, that condition is sensed and indicating circuitry signals that a match exists between the passageways and the terminals.

A firing circuit coupled to the silicon controlled rectifier activitates the circuitry by supplying energy to fire the silicon control rectifier and to energize the terminals. The SCR firing circuit disclosed in the '496 patent has been used with success and functions quite well in initiating a scan by the card reader.

SUMMARY OF THE INVENTION

While the circuitry disclosed in the '496 patent has achieved substantial commercial success, the present invention comprises an improvement on the circuitry. In particular, the present invention provides a new firing circuit for selectively energizing a card reader which is more reliable yet simple than the prior art.

The invention features circuitry for selectively providing a high voltage to opposed portions of a spark gap card reader. The circuitry is electrically connected to an alternating source of electrical energy whose output is rectified by a diode and then used to charge a capacitor. A discharge circuit for the capacitor includes a primary winding of a transformer whose secondary winding is connected to the card reader's spark gap. The discharge circuit further includes a silicon controlled rectifier (SCR). When the silicon controlled rectifier is gated into conduction the capacitor discharges through the transformer and a large voltage is applied to the spark gap. As was the case for the prior art card reader, this voltage enables the reader to sense the condition of a card within the gap.

The silicon control rectifier has its anode connected to both the positive side of the storage capacitor and to the cathode of the rectifying diode. Once the SCR gate is fired and a pulse transmitted through the transformer primary this circuit configuration insures that the SCR turns off. If this were not the case the SCR might continue to conduct and no further voltage pulses could be sent through the primary winding to enable the card reader.

The use of on diode to rectify an alternating current source is a simplification over the prior art circuitry. The prior art uses full wave rectification and filtering capacitors to generate direct current charging potentials. The present design functions with half wave rectification.

From the above it is apparent that one object of the present invention is the provision of a simple yet improved circuit for use with a spark gap card reader. This and other features and advantages of the present invention will become better understood when the drawing is considered in conjunction with the accompanying detailed description of a preferred embodiment of the invention.

DESCRIPTION OF THE PREFERRED EMBODIMENT

Figure 1:
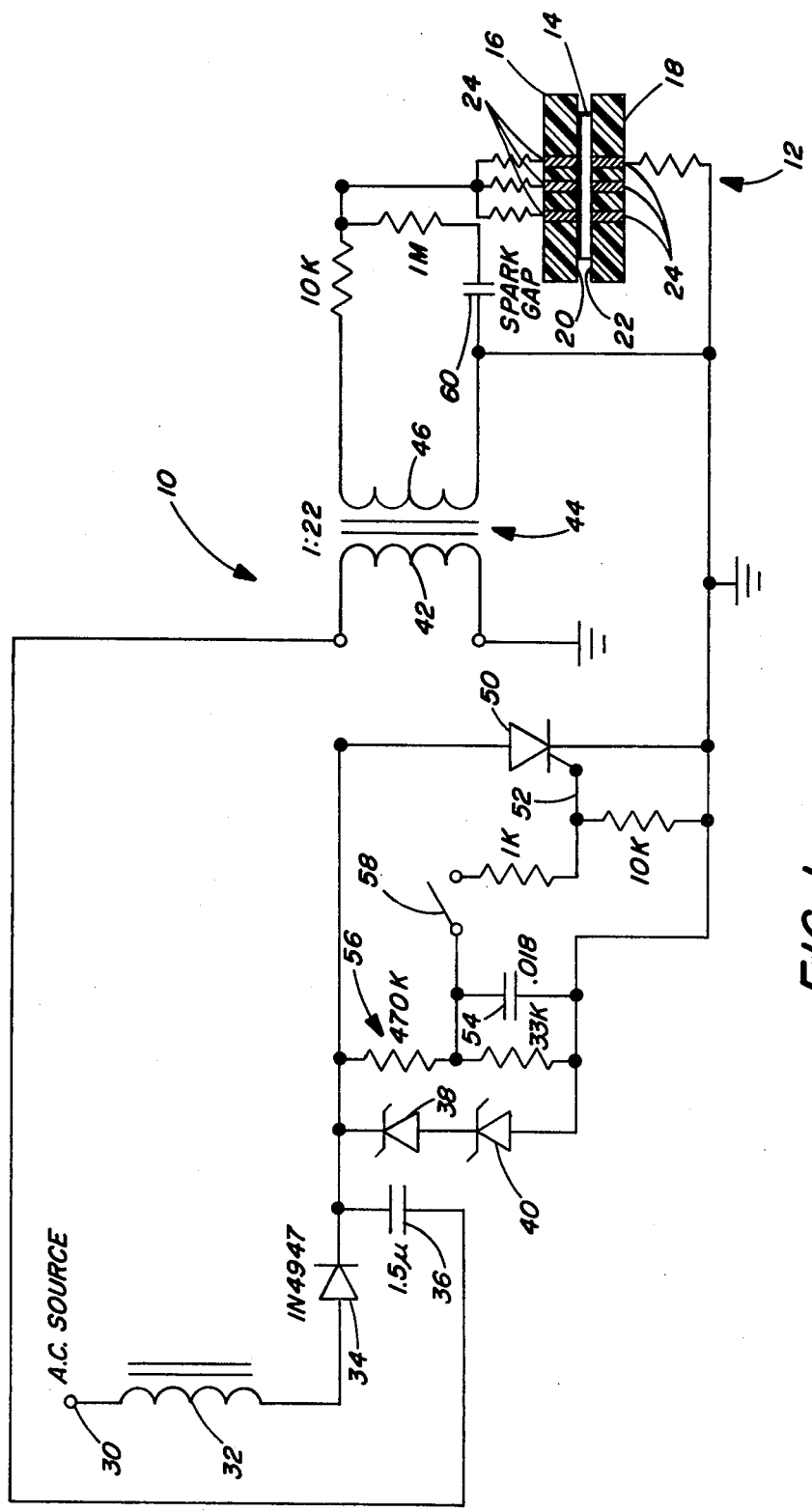

The firing circuitry of the present invention is illustrated generally at 10 in FIGURE. The circuitry 10 is coupled to an indicia sensing device 12 adapted to receive an indicia carrying member or card 14 having energy passageways of low dielectric strength. The indicia sensing device 12 preferably includes a pair of spaced apart support members in the form of generally flat horizontally disposed plates 16, 18. The plates 16, 18 include generally planar confronting surfaces 20, 22 which extend generally parallel to one another and are adapted to receive the indicia carrying member 14. Further details regarding the indicia sensing device 12 may be obtained by reference to U.S. Pat. No. 3,562,496 to Fisher which is entitled "Data Sensing Device". That patent is incorporated herein by reference.

The firing circuitry 10 is coupled to a number of terminals 24 on the opposite surfaces of the indicia sensing device 12. These terminals are positioned at select locations to cause a rather large potential difference to appear across those surfaces. The introduction of this large potential difference causes a discharge or spark through a passageway in the card 14 if that passageway aligns with two oppositely positioned terminals 24 on the indicia sensing device 12.

Circuitry discussed in the '496 patent functions to sense the discharge across the passageway thereby indicating a particular orientation of passageways exists on the card 14 under study. The circuitry for sensing this discharge is conventional and is discussed in the '496 patent. For this reason it has not been disclosed in the present application.

The firing circuitry 10 is coupled to a source of alternating current 30 which supplies the energy to be applied to the plates. In the preferred embodiment of the invention the source 30 comprises a 40 kilohertz 400 volt alternating current source whose design is known in the art. The signal from the source 30 passes through a ferrite inductor 32 to a fast diode rectifier 34. The voltage waveform appearing at the cathode of the diode is a pulsating signal which charges a capacitor 36 to a voltage of approximately 290 volts DC. This voltage value is maintained by a pair of zener diodes 38, 40 connected to a positively charged pole of the capacitor 36.

The negative pole of the capacitor 36 is coupled to ground through a primary winding 42 of a step-up transformer 44. A secondary winding 46 of this transformer 44 is coupled to one side of the indicia sensing device 12. It should be appreciated therefore that discharge of the capacitor 36 through the primary winding 42 of the transformer 44 induces a large voltage difference across the device 12. In the preferred embodiment of the invention the turns ratio of the transformer 44 is 22 to 1 and therefore the voltage difference is approximately 5000 volts. This voltage is sufficient to cause a spark to traverse the gap in the device 12 in the event the passageways in the card 14 line up with the terminals 24 on the device 12.

The capacitor 36 only discharges when a silicon control rectifier 50 is gated into conduction by the application of a positive pulse at a gate input 52. The gating signal to be applied to the SCR 50 is stored on a second capacitor 54 having its positive side coupled to a voltage divider 56. The voltage divider is connected to the positive side of the first capacitor 36 and comprises a 470 kilo ohm and 33 kilo ohm resistor combination so that the capacitor 54 is charged to approximately 18 volts.

The capacitor 54 remains charged so long as a switch 58 connected to the capacitor 54 remains open. Once the switch 58 is closed, however, a gating signal is transmitted to the gate input 52 of the SCR 50 causing the first capacitor 36 to discharge through the now conducting SCR 50. The switch 56 may be manually actuable or may be actuable by control circuitry coordinated with other portions of the card reader system. In the preferred embodiment of the invention the switch 58 comprises an optically coupled switch which responds to a light emitting diode in another portion of the system.

The functioning of the firing circuit is therefore dependent upon actuation of the switch 58. The capacitor 36 charges quite rapidly through the fast acting diode rectifier 34 and is maintained at a value of approximately 290 volts until the switch 56 is closed. This gates the SCR 50 into conduction causing the capacitor 36 to rapidly discharge causing a pulse to appear at the primary winding 42. This pulse in turn causes a 5000 volt signal to appear across the card reader 12. Sparks across the two parallel surfaces of the card reader are then sensed to determine whether the card under study matches the pattern of the terminals on the reader.

After the 5000 volt signal has been applied to the reader it is desirable that the SCR 50 be turned off to enable the circuitry to respond to subsequent closings of the switch 58. The disclosed circuitry accomplishes this reset function since the voltage at the SCR anode will drop to a slightly negative value once the capacitor 36 has discharged through the transformer 44. The first time the fast acting diode rectifier 34 is back biased by the source 30 its cathode voltage will become slightly negative and since this voltage is coupled to the SCR's anode that anode also is made slightly negative with respect to ground and therefore the SCR 50 is rendered nonconductive. Thus, as soon as the card reader is activated by a closure of the switch 58 the circuitry is reset to again respond to subsequent switch closings either manually or automatically provided.

A safety feature has been provided to avoid excessive voltage buildups on the terminals 24 in case no card passageway aligns with the terminals 24. A shunt path comprising a one megaohm resistor in series with a spark gap 60 provides a path to ground for the 5000 volt signal from the transformer 44 in the event no path exists through the card 14.

It should be appreciated that while a preferred embodiment of the invention has been described with some particularity, certain modifications and changes could be incorporated into the circuitry without departing from the spirit or scope of the invention as defined by the appended claims.

What is claimed is:

1. Circuitry for selectively providing a high voltage to opposed portions of a spark gap card reader comprising:
    (a) an alternating source of electrical energy;
    (b) a diode for providing single wave rectification of signals from said source, said diode being alternately forward and reverse biased by said source;
    (c) a capacitor coupled to said alternating source through said diode for storing electrical energy;
    (d) transformer means including an output coupled to one portion of said card reader and further including an input winding having one end coupled to said capacitor and another end coupled to ground;
    (e) controlled rectifier means including a gate, said controlled rectifier means having an anode coupled to a junction between said capacitor and said diode and a cathode coupled to ground such that when said diode is reverse biased, said controlled rectifier means is also reverse biased; and,
    (f) means to selectively energize said gate thereby discharging said capacitor to cause the transformer means to transmit a voltage to said card reader.

2. The circuitry of claim 1 wherein the voltage on said capacitor is regulated by a zener diode coupled between the capacitor and ground.

3. The circuitry of claim 1 wherein said means to selectively energize comprises a second capacitor charged by said source and a switch for selectively transmitting energy from said second capacitor to said gate.

4. The circuitry of claim 1 which further comprises a shunt path to ground for said voltage to avoid voltage buildup on said card reader.

* * * * *